US012763378B2

(12) United States Patent
You et al.

(10) Patent No.: US 12,763,378 B2
(45) Date of Patent: Oct. 13, 2026

(54) POSITIVE ELECTRODE FOR RECHARGEABLE LITHIUM BATTERY AND RECHARGEABLE LITHIUM BATTERY COMPRISING THE SAME

(71) Applicant: SAMSUNG SDI CO., LTD., Yongin-si (KR)

(72) Inventors: Duckjae You, Yongin-si (KR); San Moon, Yongin-si (KR); Jihyun Jang, Yongin-si (KR); Seongho Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 663 days.

(21) Appl. No.: 18/003,688

(22) PCT Filed: May 4, 2022

(86) PCT No.: PCT/KR2022/006434
§ 371 (c)(1),
(2) Date: May 26, 2023

(87) PCT Pub. No.: WO2022/240067
PCT Pub. Date: Nov. 17, 2022

(65) Prior Publication Data

US 2023/0352749 A1 Nov. 2, 2023

(30) Foreign Application Priority Data

May 11, 2021 (KR) ........................ 10-2021-0060891

(51) Int. Cl.
*H01M 10/42* (2006.01)
*H01M 4/131* (2010.01)
(Continued)

(52) U.S. Cl.
CPC ....... *H01M 10/4235* (2013.01); *H01M 4/131* (2013.01); *H01M 4/525* (2013.01); *H01M 2004/028* (2013.01)

(58) Field of Classification Search
CPC ......... H01M 10/4235; H01M 10/0567; H01M 4/131; H01M 4/525; H01M 2004/028
See application file for complete search history.

(56) References Cited

U.S. PATENT DOCUMENTS

2006/0204850 A1 9/2006 Ham et al.
2009/0194747 A1 8/2009 Zou et al.
(Continued)

FOREIGN PATENT DOCUMENTS

CN 105745778 B 7/2016
JP 02-068855 A 3/1990
(Continued)

OTHER PUBLICATIONS

International Search Report for corresponding Application No. PCT/KR2022/006434 dated Aug. 4, 2022, 4pp.
(Continued)

*Primary Examiner* — Christopher P Domone
(74) *Attorney, Agent, or Firm* — Womble Bond Dickinson (US) LLP

(57) ABSTRACT

Provided are a positive electrode for a rechargeable lithium battery and a rechargeable lithium battery including the same, the positive electrode including a current collector and a positive electrode active material layer on the current collector, wherein the positive electrode active material layer includes a positive electrode active material and an aromatic monovalent carboxylic acid.

9 Claims, 2 Drawing Sheets

(51) Int. Cl.

| | |
|---|---|
| ***H01M 4/525*** | (2010.01) |
| *H01M 4/02* | (2006.01) |

(56) References Cited

U.S. PATENT DOCUMENTS

| | | | | |
|---|---|---|---|---|
| 2010/0266882 | A1 | 10/2010 | Igarashi et al. | |
| 2014/0120423 | A1* | 5/2014 | Matsuo | H01M 4/663 429/231.1 |
| 2014/0255796 | A1 | 9/2014 | Matsuoka et al. | |
| 2014/0346392 | A1 | 11/2014 | Yeon et al. | |
| 2016/0218352 | A1* | 7/2016 | Musameh | H01M 10/0569 |
| 2020/0350577 | A1* | 11/2020 | Uematsu | H01M 4/131 |
| 2021/0043938 | A1 | 2/2021 | Piao et al. | |

FOREIGN PATENT DOCUMENTS

| | | | |
|---|---|---|---|
| JP | 11-86846 | A | 3/1999 |
| JP | 2001-035495 | A | 2/2001 |
| JP | 2005-011594 | A | 1/2005 |
| JP | 2017-054822 | A | 3/2017 |
| JP | 2017-199562 | A | 11/2017 |
| KR | 10-2003-0057225 | A | 7/2003 |
| KR | 10-2006-0092553 | A | 8/2006 |
| KR | 10-2006-0098789 | A | 9/2006 |
| KR | 10-2013-0042657 | A | 4/2013 |
| KR | 10-2014-0102195 | A | 8/2014 |
| KR | 10-2018-0119336 | A | 11/2018 |
| KR | 10-2020-0080141 | A | 7/2020 |
| WO | WO 2009/097680 | A1 | 8/2009 |
| WO | WO2019093313 | * | 5/2019 |

OTHER PUBLICATIONS

Extended European Search Report issued in corresponding EP Application No. 22807715.2, dated Jun. 10, 2025 (9 pages).

* cited by examiner

POSITIVE ELECTRODE FOR RECHARGEABLE LITHIUM BATTERY AND RECHARGEABLE LITHIUM BATTERY COMPRISING THE SAME

CROSS-REFERENCE TO RELATED APPLICATION(S)

This application is a National Phase Patent Application of International Patent Application Number PCT/KR2022/006434, filed on May 4, 2022, which claims priority of Korean Patent Application No. 10-2021-0060891, filed May 11, 2021. The entire contents of both of which are incorporated herein by reference.

TECHNICAL FIELD

A positive electrode for a rechargeable lithium battery and a rechargeable lithium battery including the same are disclosed.

BACKGROUND ART

As a driving power source for mobile information terminals such as cell phones, laptops, smart phones, and the like, small-sized rechargeable lithium batteries being easily portable and having high energy density are mainly used. In addition, rechargeable lithium batteries are used in medium and large-sized batteries used as a driving power source or a power storage for hybrid vehicles and electric vehicles and also used for an energy storage system. From these medium and large-sized rechargeable lithium batteries to the small rechargeable lithium batteries, rechargeable lithium batteries in all fields require high-capacity. Accordingly, high nickel-based compounds having high-capacity are widely used as a positive electrode active material. However, as a content of nickel in the positive electrode active material increases, the capacity increases, but there are problems such as a decrease in cycle-life, safety, and the like. In order to solve these problems, research on coating the surface of the high-nickel-based positive electrode active material, doping a heterogeneous element, or the like is being conducted, which also have problems of increasing a cost due to the process addition and rather deteriorating capacity of the active material.

DISCLOSURE

Technical Problem

Provided are a positive electrode for a rechargeable lithium battery with improved thermal safety and improved high-temperature cycle-life, and a rechargeable lithium battery including the same.

Technical Solution

In an embodiment, a positive electrode for a rechargeable lithium battery includes a current collector and a positive electrode active material layer on the current collector, wherein the positive electrode active material layer includes a positive electrode active material and an aromatic monovalent carboxylic acid.

Another embodiment provides a rechargeable lithium battery including the positive electrode, the negative electrode, a separator between the positive electrode and the negative electrode, and an electrolyte.

Advantageous Effects

A positive electrode for a rechargeable lithium battery according to an embodiment and a rechargeable lithium battery including the same have improved thermal safety and improved high-temperature cycle-life.

MODE FOR INVENTION

Figure 1:
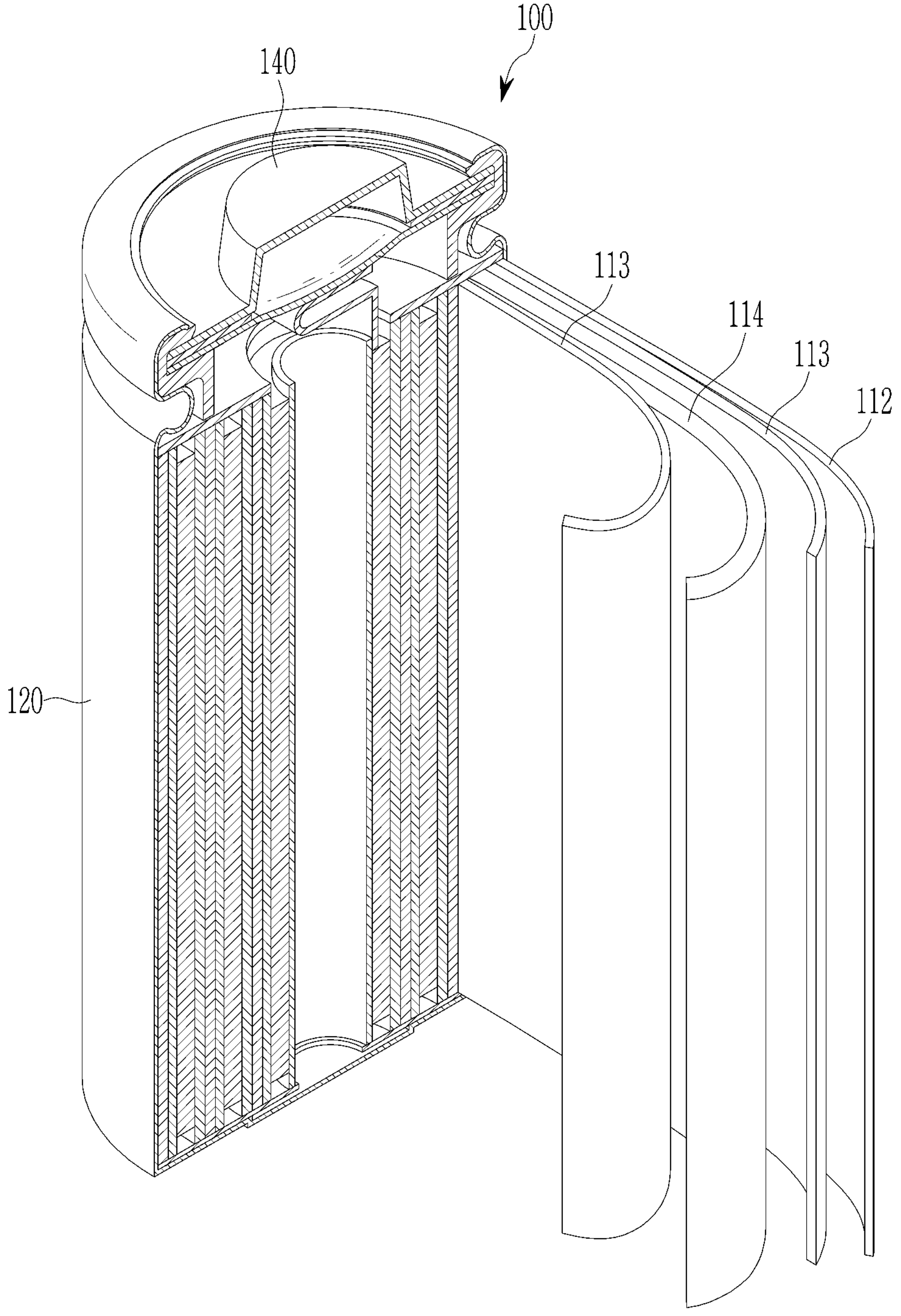
FIG. 1 is a schematic view illustrating a rechargeable lithium battery according to an embodiment.

Hereinafter, specific embodiments will be described in detail so that those of ordinary skill in the art can easily implement them. However, this disclosure may be embodied in many different forms and is not construed as limited to the example embodiments set forth herein.

The terminology used herein is used to describe embodiments only, and is not intended to limit the present invention. The singular expression includes the plural expression unless the context clearly dictates otherwise.

Herein, "combination thereof" means a mixture, laminate, composite, copolymer, alloy, blend, reaction product, and the like of the constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, "layer" herein includes not only a shape formed on the whole surface when viewed from a plan view, but also a shape formed on a partial surface.

In an embodiment, a positive electrode for a rechargeable lithium battery includes a current collector and a positive electrode active material layer on the current collector, wherein the positive electrode active material layer includes a positive electrode active material and an aromatic monovalent carboxylic acid. The positive electrode for a rechargeable lithium battery according to an embodiment may improve high-temperature cycle-life characteristics and thermal safety while maintaining basic battery characteristics such as high capacity, charge/discharge efficiency, and rate capability at a high level.

The aromatic monocarboxylic acid refers to an aromatic compound having one carboxyl group (—COOH) in the molecule. Herein, the aromatic compound may be benzene, naphthalene, anthracene, phenanthrene, azulene, pyridine, thiophene, indole, or purine. Among them, the aromatic compound may be, for example, benzene, naphthalene, anthracene, phenanthrene, or azulene, which is an aromatic compound composed of only carbon and hydrogen atoms without having a heteroatom.

The positive electrode including an aromatic compound having one carboxyl group and a rechargeable lithium battery including the same may secure improved thermal safety and high temperature cycle-life characteristics. Compared with an aromatic compound having two or more carboxyl groups, for example, aromatic divalent carboxylic acid, aromatic trivalent carboxylic acid, and the like and also, an aliphatic compound having at least one carboxyl group, the aromatic monovalent carboxylic acid may exert much superior effects of improving thermal safety and high temperature cycle-life characteristics of a battery.

The aromatic monovalent carboxylic acid may include, for example, a compound represented by Chemical Formula 1, a compound represented by Formula 2, or a combination thereof.

[Chemical Formula 1]

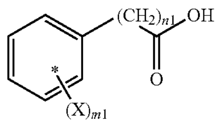

In Chemical Formula 1, n1 is any one of integers from 0 to 3, X is a substituted or unsubstituted C1 to C5 alkyl group, —C(═O)$R^1$ ($R^1$ is hydrogen, or a substituted or unsubstituted C1 to C5 alkyl group), —C(═O)O$R^2$ ($R^2$ is a substituted or unsubstituted C1 to C5 alkyl group), —O$R^3$ ($R^3$ is hydrogen, or a substituted or unsubstituted C1 to C5 alkyl group), a halogen, or a combination thereof, m1 is any one of integers from 0 to 5, and "*" means a bond.

[Chemical Formula 2]

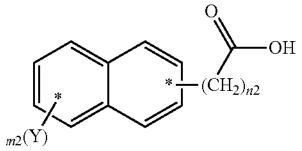

In Chemical Formula 2, n2 is any one of integers from 0 to 3, Y is a substituted or unsubstituted C1 to C5 alkyl group, —C(═O)$R^1$($R^1$ is hydrogen, or a substituted or unsubstituted C1 to C5 alkyl group), —C(═O)O$R^2$ ($R^2$ is a substituted or unsubstituted C1 to C5 alkyl group), —O$R^3$ ($R^3$ is hydrogen, or a substituted or unsubstituted C1 to C5 alkyl group), a halogen, or a combination thereof, m2 is any one of integers from 0 to 7, and "*" means a bond.

The substituted in "substituted or unsubstituted" herein means that a hydrogen atom is replaced by, for example, a halogen (e.g., F, Br, C1, or I), a hydroxyl group, an amino group, an alkyl group, or the like. Also, the C1 to C5 alkyl group may be, for example, a C1 to C4 alkyl group, a C1 to C3 alkyl group, or a C1 to C2 alkyl group.

Since the compound represented by Chemical Formula 1 and the compound represented by Chemical Formula 2 are examples of aromatic compounds having one carboxyl group, X in Chemical Formula 1 is not a carboxyl group and Y in Chemical Formula 2 is not a carboxyl group.

In Chemical Formula 1, n1 may be, for example, an integer of 0 to 2, and may be, for example, 0 or 1. X may be, for example, a substituted or unsubstituted C1 to C5 alkyl group, —C(═O)$R^1$ ($R^1$ is hydrogen, or a substituted or unsubstituted C1 to C5 alkyl group), or a combination thereof, and $R^1$ may be, for example, a substituted or unsubstituted C1 to C3 alkyl group. m1 means the number of substitution with X among the remaining 5 hydrogens of the benzene ring, and may be, for example, an integer from 0 to 3, for example 0 or 1.

In Chemical Formula 2, n2 may be, for example, an integer of 0 to 2, and may be, for example, 0 or 1. Y may be, for example, a substituted or unsubstituted C1 to C5 alkyl group, —C(═O)$R^1$ ($R^1$ is hydrogen or a substituted or unsubstituted C1 to C5 alkyl group), or a combination thereof, and $R^1$ may be, for example, a substituted or unsubstituted C1 to C3 alkyl group. m2 means the number of substitution with Y among the remaining 7 hydrogens of the naphthalene ring, and may be, for example, an integer from 0 to 3, for example 0 or 1.

The positive electrode including the aromatic monovalent carboxylic acid including the compound represented by Chemical Formula 1, the compound represented by Chemical Formula 2, or a combination thereof and a rechargeable lithium battery including the same may exhibit excellent thermal safety and high-temperature cycle-life characteristics.

The aromatic monovalent carboxylic acids may be, for example, benzoic acid, salicylic acid, acetyl salicylic acid, 1-naphthalene acetic acid, 4-acetylnaphthalene-1-carboxylic acid, 3-hydroxynaphthalene-2-carboxylic acid, 6-hydroxynaphthalene-2-carboxylic acid, or 8-hydroxynaphthalene-2-carboxylic acid, but is not limited thereto.

The aromatic monovalent carboxylic acid may be included in an amount of 0.01 wt % to 1 wt %, for example 0.01 wt % to 0.9 wt %, 0.01 wt % to 0.8 wt %, 0.01 wt % to 0.7 wt %, 0.01 wt % to 0.6 wt %, 0.01 wt % to 0.5 wt %, 0.01 wt % to 0.4 wt %, or 0.01 wt % to 0.3 wt %, or 0.05 wt % to 1 wt %, 0.1 wt % to 1 wt %, or 0.1 wt % to 0.5 wt % based on 100 wt % of the positive electrode active material layer. When the content of the aromatic monovalent carboxylic acid satisfies the above range, a rechargeable lithium battery including the same may improve thermal safety and high-temperature cycle-life characteristics while maintaining all other battery characteristics such as capacity and efficiency.

The positive electrode active material may include a lithium nickel-based transition metal oxide containing 88 mol % or more of nickel based on the total content of the transition metal other than lithium. The lithium nickel-based transition metal oxide may include 88 mol % or more, 89 mol % or more, or 90 mol % or more of nickel based on the total content of the transition metal other than lithium. As such, the positive electrode active material containing nickel at an ultra-high concentration is very advantageous for realizing a high-capacity battery. However, when the content of nickel is 88 mol % or more, cycle-life characteristics are significantly lowered at high temperatures, and problems with thermal safety frequently occur. However, the positive electrode for a rechargeable lithium battery according to an embodiment contains an aromatic monovalent carboxylic acid together with a high nickel-based positive electrode active material, thereby securing thermal stability while maintaining a high capacity, and dramatically improving high-temperature cycle-life characteristics. In addition, the application of the aromatic monovalent carboxylic acid to the high-nickel-based positive electrode active material may exhibit much superior high-temperature cycle-life characteristics to the addition of an aromatic compound having two or more carboxyl groups, for example, aromatic divalent carboxylic acid, aromatic trivalent carboxylic acid, and the like, or to the addition of an aliphatic compound having one or more carboxyl groups.

The positive electrode active material may include, for example, a compound represented by Chemical Formula 11.

[Chemical Formula 11]

$$Li_aNi_xM^1_yM^2_zO_2$$

In Chemical Formula 11, $0.9 \leq a \leq 1.2$, $0.88 \leq x \leq 0.99$, $0.005 \leq y \leq 0.1$, $0.005 \leq z \leq 0.1$, and $x+y+z=1$, and $M^1$ and $M^2$ are each independently at least one element selected from Co, Mn, Al, Cr, Fe, V, Mg, Ti, Zr, Nb, Mo, W, Cu, Zn, Ga, In, Sn, La, and Ce.

In Chemical Formula 11, x representing the content of nickel may be 0.88 or more, and for example, 0.90 or more, 0.92 or more, or 0.94 or more. When a compound having a nickel content of 88 mol % or more as shown in Chemical Formula 11 is applied as a positive electrode active material, a battery including the compound may exhibit excellent battery characteristics while realizing a very high capacity.

The positive electrode active material may include, for example, a compound represented by Chemical Formula 12.

[Chemical Formula 12]

$$Li_{a2}Ni_{x2}Co_{y2}Al_{1-x2-y2}O_2$$

In Chemical Formula 12, $0.9 \leq a2 \leq 1.2$, $0.88 \leq x2 \leq 1$, and $0 \leq y2 \leq 0.12$. Alternatively, $0.90 \leq x2 \leq 1$ and $0 \leq y2 \leq 0.10$, or $0.92 \leq x2 \leq 1$ and $0 \leq y2 \leq 0.08$. When the compound represented by Chemical Formula 12 is applied as a positive electrode active material, a battery including the compound may exhibit excellent battery characteristics while realizing a very high capacity.

The positive electrode active material layer may further include a binder, and in this case, the binder may be included in an amount of 0.1 wt % to 5 wt % or 0.1 wt % to 4 wt %, 0.1 wt % to 3 wt %, 0.5 wt % to 2 wt % based on 100 wt % of the positive electrode active material layer.

The binder improves binding properties of positive electrode active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The positive electrode active material layer may further include a conductive material, and in this case, the conductive material may be included in an amount of 0.1 wt % to 5 wt %, or 0.1 wt % to 4 wt %, 0.1 wt % to 3 wt %, 0.5 wt % to 2 wt % based on 100 wt % of the positive electrode active material layer.

The conductive material is included to provide electrode conductivity and may be, for example, a carbon-based material such as natural graphite, artificial graphite, carbon black, acetylene black, ketjen black, a carbon fiber, a carbon nanotube, and the like; a metal-based material of a powder or a fiber including copper, nickel, aluminum, silver, and the like; a conductive polymer such as a polyphenylene derivative; or a mixture thereof.

When the positive electrode active material layer further includes a conductive material and a binder, based on 100 wt % of the positive electrode active material layer, the positive electrode active material may be included in an amount of 90 wt % to 99 wt %, and the aromatic monovalent carboxylic acid may be included in an amount of 0.01 wt % to 1 wt %, the binder may be included in an amount of 0.1 wt % to 5 wt %, and the conductive material may be included in an amount of 0.1 wt % to 5 wt %. When the content of each component in the positive electrode active material layer satisfies the above range, thermal safety and high-temperature cycle-life characteristics may be improved while maintaining a very high capacity.

The content of the positive electrode active material may be appropriately adjusted according to the content of other components, and may be, for example, 91 wt % to 99 wt %, 92 wt % to 99 wt %, 93 wt % to 99 wt %, 94 wt % to 99 wt %, or 95 wt % to 98 wt % based on 100 wt % of the positive electrode active material layer.

In the positive electrode for a rechargeable lithium battery according to an embodiment, the current collector may be selected from an aluminum foil, a copper foil, a nickel foil, a stainless steel foil, a titanium foil, a nickel foam, a copper foam, a polymer substrate coated with a conductive metal, and a combination thereof.

Another embodiment provides a rechargeable lithium battery including the positive electrode, the negative electrode, a separator between the positive electrode and the negative electrode, and an electrolyte.

FIG. 1 is a schematic view illustrating a rechargeable lithium battery according to an embodiment. Referring to FIG. 1, a rechargeable lithium battery 100 according to an embodiment of the present invention includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, negative electrode 112, and separator 113, a battery case 120 housing the battery cell, and a sealing member 140 sealing the battery case 120.

A negative electrode 112 for a rechargeable lithium battery includes a current collector and a negative electrode active material layer formed on the current collector and including a negative electrode active material.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example crystalline carbon, amorphous carbon, or a combination thereof as a carbon-based negative electrode active material. The crystalline carbon may be non-shaped, or sheet, flake, spherical, or fiber shaped natural graphite or artificial graphite and the amorphous carbon may be a soft carbon, a hard carbon, a mesophase pitch carbonization product, calcined coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material or a Sn-based negative electrode active material, wherein the Si-based negative electrode active material may include silicon, a silicon-carbon composite, $SiO_x$ ($0 \leq x \leq 2$), a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative electrode active material may include Sn, $SnO_2$, a Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn), and at least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof.

The silicon-carbon composite may be a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin such as a phenol resin, a furan resin, or a polyimide resin. In this case, the content of silicon may be 10 wt % to 50 wt % based on the total weight of the silicon-carbon composite. In addition, the content of the crystalline carbon may be 10 wt % to 70 wt % based on the total weight of the silicon-carbon composite, and the content of the amorphous carbon may be 20 wt % to 40 wt % based on the total weight of the silicon-carbon composite. In addition, a thickness of the amorphous carbon coating layer may be 5 nm to 100 nm. An average particle diameter (D50) of the silicon particles may be 10 nm to 20 μm. The average particle diameter (D50) of the silicon particles may be preferably 10 nm to 200 nm. The silicon particles may exist in an oxidized form, and in this case, an atomic content ratio of Si:O in the silicon particles indicating a degree of oxidation may be a weight ratio of 99:1 to 33:67. The silicon particles may be $SiO_x$ particles, and in this case, the range of x in $SiO_x$ may be greater than 0 and less than 2. In the present specification, unless otherwise defined, an average particle diameter (D50) indicates a particle where a cumulative volume is 50 volume % in a particle distribution.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and used, the mixing ratio may be a weight ratio of 1:99 to 10:90.

In the negative electrode active material layer, the negative electrode active material may be included in an amount of 90 wt % to 99 wt % based on the total weight of the negative electrode active material layer.

In an embodiment, the negative electrode active material layer further includes a binder, and may optionally further include a conductive material. The content of the binder in the negative electrode active material layer may be 0.1 wt % to 5 wt % based on the total weight of the negative electrode active material layer. In addition, when the conductive material is further included, the negative electrode active material layer may include 90 wt % to 98 wt % of the negative electrode active material, 0.1 wt % to 5 wt % of the binder, and 0.1 wt % to 5 wt % of the conductive material.

The binder serves to well adhere the negative electrode active material particles to each other and also to adhere the negative electrode active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and used. As the alkali metal, Na, K or Li may be used. The amount of the thickener used may be 0.1 parts by weight to 3 parts by weight based on 100 parts by weight of the negative electrode active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, a carbon nanotube, and the like; a metal-based material of a powder or a fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent includes methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like and the ketone-based solvent may be cyclohexanone, and the like. In addition, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxolanes such as 1,3-dioxolane, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

In addition, in the case of the carbonate-based solvent, a mixture of a cyclic carbonate and a chain carbonate may be used. In this case, when the cyclic carbonate and the chain carbonate are mixed in a volume ratio of about 1:1 to about 1:9, the electrolyte may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

The aromatic hydrocarbon-based solvent may be an aromatic hydrocarbon-based compound represented by Chemical Formula 1.

[Chemical Formula I]

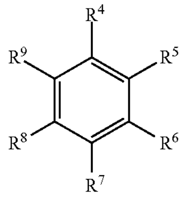

In Chemical Formula I, $R^4$ to $R^9$ are the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula II in order to improve cycle-life of a battery.

[Chemical Formula II]

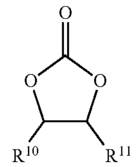

In Chemical Formula II, $R^{10}$ and $R^{11}$ are the same or different and selected from hydrogen, a halogen, a cyano group, a nitro group, and fluorinated C1 to C5 alkyl group, provided that at least one of $R^{10}$ and $R^{11}$ is a halogen, a cyano group, a nitro group, and fluorinated C1 to C5 alkyl group, and $R^{10}$ and $R^{11}$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide); LiFSI), $LiC_4FsSO_3$, $LiClO_4$, $LiAlO_2$, $LiAlCl_4$, $LiPO_2F_2$, $LiN(CxF_{2x+1}SO_2)(C_yF_{2y+1}SO_2)$, wherein x and y are natural numbers, for example, an integer ranging from 1 to 20, lithium difluoro (bisoxolato) phosphate, LiCl, LiI, $LiB(C_2O_4)_2$ (lithium bis (oxalato) borate; LiBOB), and lithium difluoro(oxalato) borate (LiDFOB).

The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The separator 113 that is also called a separating layer separates a positive electrode 114 and a negative electrode 112 and provides a transporting passage for lithium ions and may be any generally-used separator in a lithium ion battery. In other words, it may have low resistance to ion transport and excellent impregnation for an electrolyte. For example, separator may be selected from a glass fiber, polyester, Teflon, polyethylene, polypropylene, polytetrafluoroethylene, or a combination thereof. It may have a form of a non-woven fabric or a woven fabric. For example, in a lithium ion battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure. Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and manufacturing methods of these batteries are well known in the art, and thus detailed descriptions thereof will be omitted.

DETAILED DESCRIPTION OF THE EMBODIMENTS

Hereinafter, examples of the present invention and comparative examples are described. It is to be understood, however, that the examples are for the purpose of illustration and are not to be construed as limiting the present invention.

Example 1

(1) Manufacture of Positive Electrode 97.6 wt % of a positive electrode active material of $Li_{1\pm a}Ni_{0.916}Co_{0.07}Al_{0.014}O_2$, 1.0 wt % of a conductive material of carbon nanotube, 1.3 wt % of a binder of PVDF, and 0.1 wt % of acetyl salicylic acid are mixed in a solvent of NMP, preparing slurry for positive electrode coating. This slurry is coated to have current density of 2 mAh/$cm^2$ on one surface of an aluminum current collector and dried at 110° C. for 3 hours, manufacturing a positive electrode.

(2) Manufacture of Battery Cell

The positive electrode, a separator with a polyethylene/polypropylene multi-layer structure, and a negative electrode of lithium metal are sequentially stacked, and an electrolyte prepared by adding a 1.0 M $LiPF_6$ lithium salt, to a solvent of ethylene carbonate and diethyl carbonate mixed in a volume ratio of 50:50 is injected thereinto, manufacturing a half cell.

Example 2

A positive electrode, a negative electrode, and a battery cell are manufactured in the same manner as in Example 1 except that 0.1 wt % of 1-naphthalene acetic acid is added instead of the acetyl salicylic acid.

Example 3

A positive electrode, a negative electrode, and a battery cell are manufactured in the same manner as in Example 1 except that 97.5 wt % of the positive electrode active material and 0.2 wt % of the acetyl salicylic acid are used to manufacture the positive electrode.

Example 4

A positive electrode, a negative electrode, and a battery cell are manufactured in the same manner as in Example 2 except that 97.5 wt % of the positive electrode active material and 0.2 wt % of 1-naphthalene acetic acid are used to manufacture the positive electrode.

Comparative Example 1

A positive electrode, a negative electrode, and a battery cell are manufactured in the same manner as in Example 1 except that 97.7 wt % of the positive electrode active material, 1.0 wt % of the conductive material, and 1.3 wt % of the binder of PVDF are mixed in the solvent of NMP.

Comparative Example 2

A positive electrode, a negative electrode, and a battery cell are manufactured in the same manner as in Example 1 except that 0.1 wt % of oxalic acid corresponding to aliphatic divalent carboxylic acid is used instead of the acetyl salicylic acid.

Comparative Example 3

A positive electrode, a negative electrode, and a battery cell are manufactured in the same manner as in Example 1 except that 0.1 wt % of phthalic acid corresponding to aromatic divalent carboxylic acid is used instead of the acetyl salicylic acid.

Evaluation Example 1: Evaluation of High-temperature Cycle-life Characteristics The half cells according to Examples 1 to 4 and Comparative Examples 1 to 3 are charged and discharged at a 1.0 C rate at 45° C. to evaluate high temperature cycle-life characteristics, and a change in discharge capacity according to the number of cycles of each cell is shown in FIG. 2.

Figure 2:
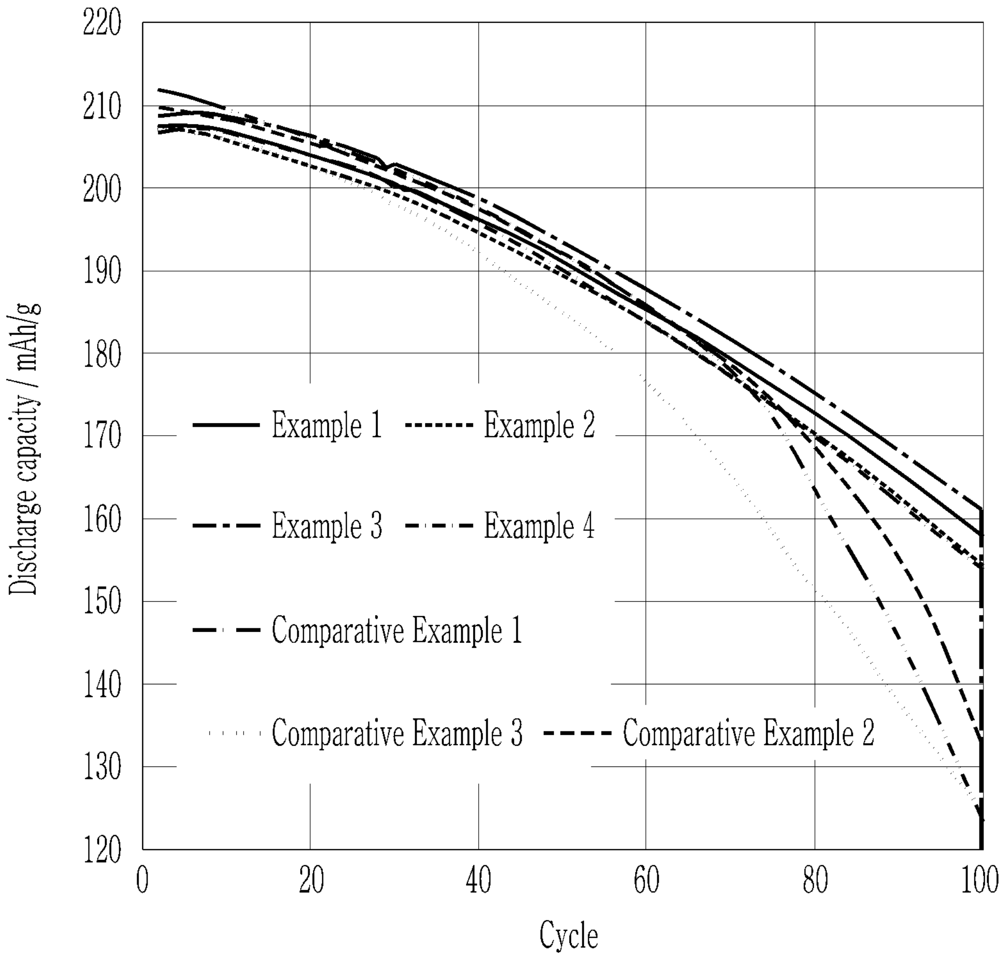
FIG. 2 is a graph showing high-temperature cycle-life characteristics of half cells according to examples and comparative examples.

Referring to FIG. 2, the half cells of Comparative Examples 1 to 3 exhibit sharp deterioration of discharge capacity from about 80 cycles, but the half-cells of Examples 1 to 4 exhibit no sharp deterioration of discharge capacity after the 80 cycles and thus improvement of a high temperature cycle-life.

Evaluation Example 2: Evaluation of Charge/Discharge Efficiency

The half cells of Examples 1 to 4 and Comparative Examples 1 to 3 are charged and discharged at 0.33 C at room temperature and then, measured with respect to charge/discharge efficiency through charge capacity and discharge capacity, and the results are shown in Table 1 below.

TABLE 1

| | Charge capacity (mAh/g) | Discharge capacity (mAh/g) | Efficiency (%) |
|---|---|---|---|
| Comparative Example 1 | 209.3 | 205.5 | 98.2 |
| Comparative Example 2 | 208.5 | 204.6 | 98.1 |
| Comparative Example 3 | 205.1 | 201.1 | 98.0 |
| Example 1 | 207.6 | 203.7 | 98.1 |
| Example 2 | 207.5 | 203.6 | 98.1 |
| Example 3 | 209.4 | 205.4 | 98.1 |
| Example 4 | 207.9 | 204.0 | 98.1 |

Referring to Table 1, Examples 1 to 4 exhibit no deteriorated charge/discharge efficiency but maintain equivalent excellent efficiency, compared with the comparative examples. Accordingly, an embodiment may accomplish an effect of improving high temperature cycle-life and excellent charge/discharge efficiency at the same time.

Although the preferred embodiments have been described in detail, the scope of the present invention is not limited thereto, and various modifications and improvements of those skilled in the art using the basic concepts defined in the following claims are also within the scope of the present invention.

| [Description of Symbols] | |
|---|---|
| 100: | rechargeable lithium battery |
| 112: | negative electrode |
| 113: | separator |
| 114: | positive electrode |
| 120: | battery case |
| 140: | sealing member |

The invention claimed is:

1. A positive electrode for a rechargeable lithium battery, comprising a current collector and a positive electrode active material layer on the current collector, wherein the positive electrode active material layer includes a positive electrode active material and an aromatic monovalent carboxylic acid, and the positive electrode active material includes a lithium nickel-based transition metal oxide containing 88 mol % or more of nickel based on the total content of transition metals other than lithium.

2. The positive electrode for the rechargeable lithium battery of claim 1, wherein the aromatic monovalent carboxylic acid includes a compound represented by Chemical Formula 1, a compound represented by Chemical Formula 2, or a combination thereof:

[Chemical Formula 1]

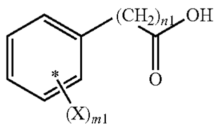

[Chemical Formula 2]

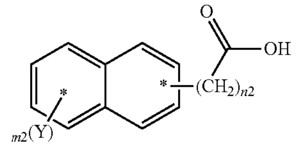

wherein, in Chemical Formula 1, n1 is any one of integers from 0 to 3, X is a substituted or unsubstituted C1 to C5 alkyl group, —C(═O)$R^1$ ($R^1$ is hydrogen, or a substituted or unsubstituted C1 to C5 alkyl group), —C(═O)O$R^2$ ($R^2$ is a substituted or unsubstituted C1 to C5 alkyl group), —O$R^3$ ($R^3$ is hydrogen, or a substituted or unsubstituted C1 to C5 alkyl group), a halogen, or a combination thereof, and m1 is any one of integers from 0 to 5, and in Chemical Formula 2, n2 is any one of integers from 0 to 3, Y is a substituted or unsubstituted C1 to C5 alkyl group, —C(═O)$R^1$ ($R^1$ is hydrogen, or a substituted or unsubstituted C1 to C5 alkyl group), —C(═O)O$R^2$ ($R^2$ is a substituted or unsubstituted C1 to C5 alkyl group), —O$R^3$ ($R^3$ is hydrogen, or a substituted or unsubstituted C1 to C5 alkyl group), a halogen, or a combination thereof, and m2 is any one of integers from 0 to 7.

3. The positive electrode for the rechargeable lithium battery of claim 2, wherein the aromatic monovalent carboxylic acid is acetyl salicylic acid or 1-naphthalene acetic acid.

4. The positive electrode for the rechargeable lithium battery of claim 1, wherein the aromatic monovalent carboxylic acid is included in an amount of 0.01 wt % to 1 wt % based on 100 wt % of the positive electrode active material layer.

5. The positive electrode for the rechargeable lithium battery of claim 1, wherein the positive electrode active material includes a compound represented by Chemical Formula 11:

[Chemical Formula 11]

$$Li_aNi_xM^1_yM^2_zO_2$$

wherein, in Chemical Formula 11, $0.9 \leq a \leq 1.2$, $0.88 \leq x \leq 0.99$, $0.005 \leq y \leq 0.1$, $0.005 \leq z \leq 0.1$, and $x+y+z=1$, and M1 and M2 are each independently at least one element selected from Co, Mn, Al, Cr, Fe, V, Mg, Ti, Zr, Nb, Mo, W, Cu, Zn, Ga, In, Sn, La, and Ce.

6. The positive electrode for the rechargeable lithium battery of claim 1, wherein the positive electrode active material layer further includes a binder.

7. The positive electrode for the rechargeable lithium battery of claim 1, wherein the positive electrode active material layer further includes a conductive material.

8. The positive electrode for the rechargeable lithium battery of claim 1, wherein the positive electrode active material layer further includes a conductive material and a binder, wherein based on 100 wt % of the positive electrode active material layer, the positive electrode active material is included in an amount of 90 wt % to 99 wt %, the aromatic monovalent carboxylic acid is included in an amount of 0.01 wt % to 1 wt %, the binder is included in an amount of 0.1 wt % to 5 wt %, and the conductive material is included in an amount of 0.1 wt % to 5 wt %.

9. A rechargeable lithium battery, comprising the positive electrode of claim 1, a negative electrode, a separator between the positive electrode and the negative electrode, and an electrolyte.

* * * * *